(No Model.) 5 Sheets—Sheet 1.
E. H. AMET.
AUTOMATIC WEIGHING AND RECORDING APPARATUS.
No. 385,900. Patented July 10, 1888.
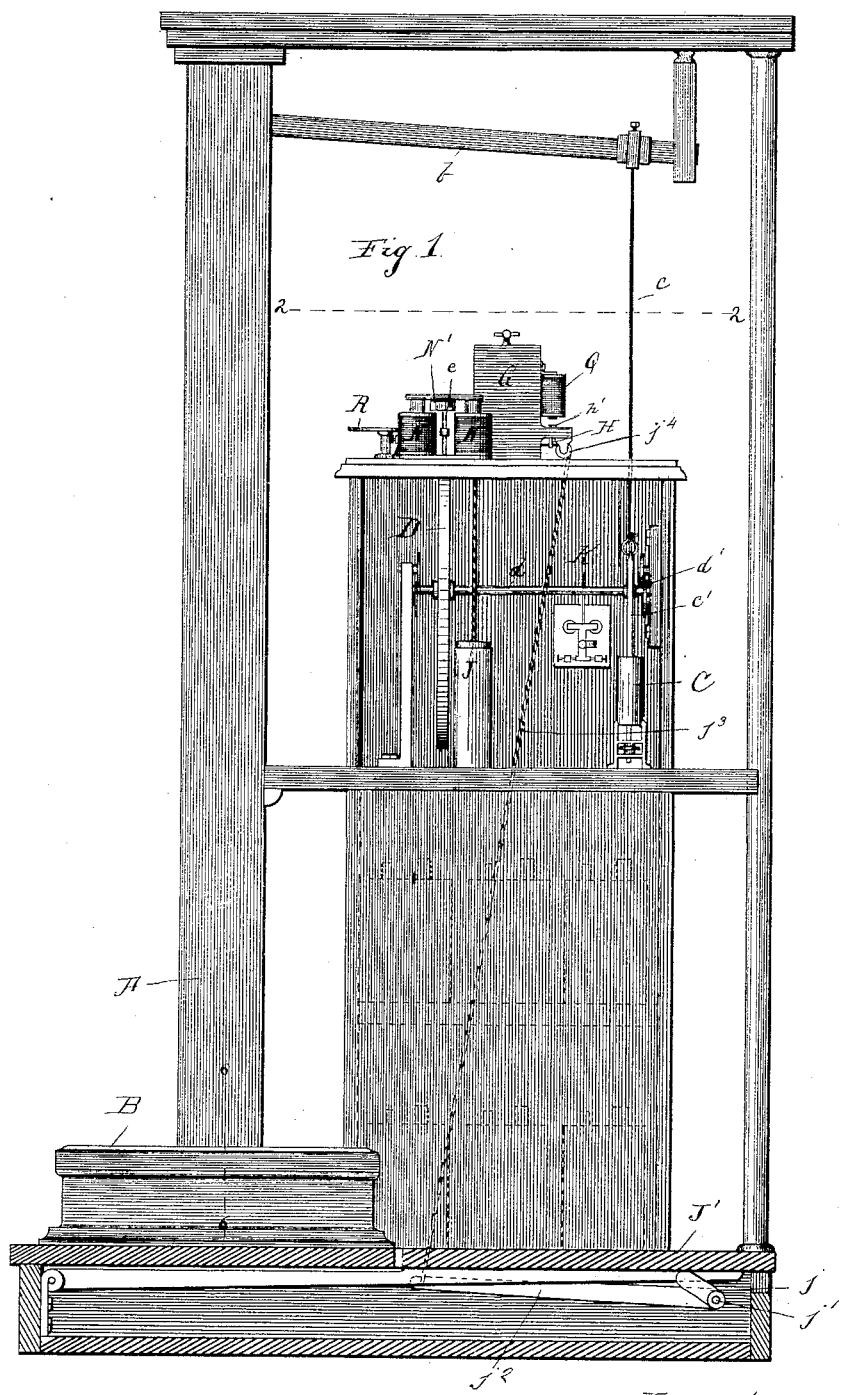
Witnesses:
Lew E. Curtis.
H. W. Munday
Inventor:
Edward H. Amet.
By Munday Evarts & Adcock
his Attorneys.

(No Model.) 5 Sheets—Sheet 2.
E. H. AMET.
AUTOMATIC WEIGHING AND RECORDING APPARATUS.
No. 385,900. Patented July 10, 1888.
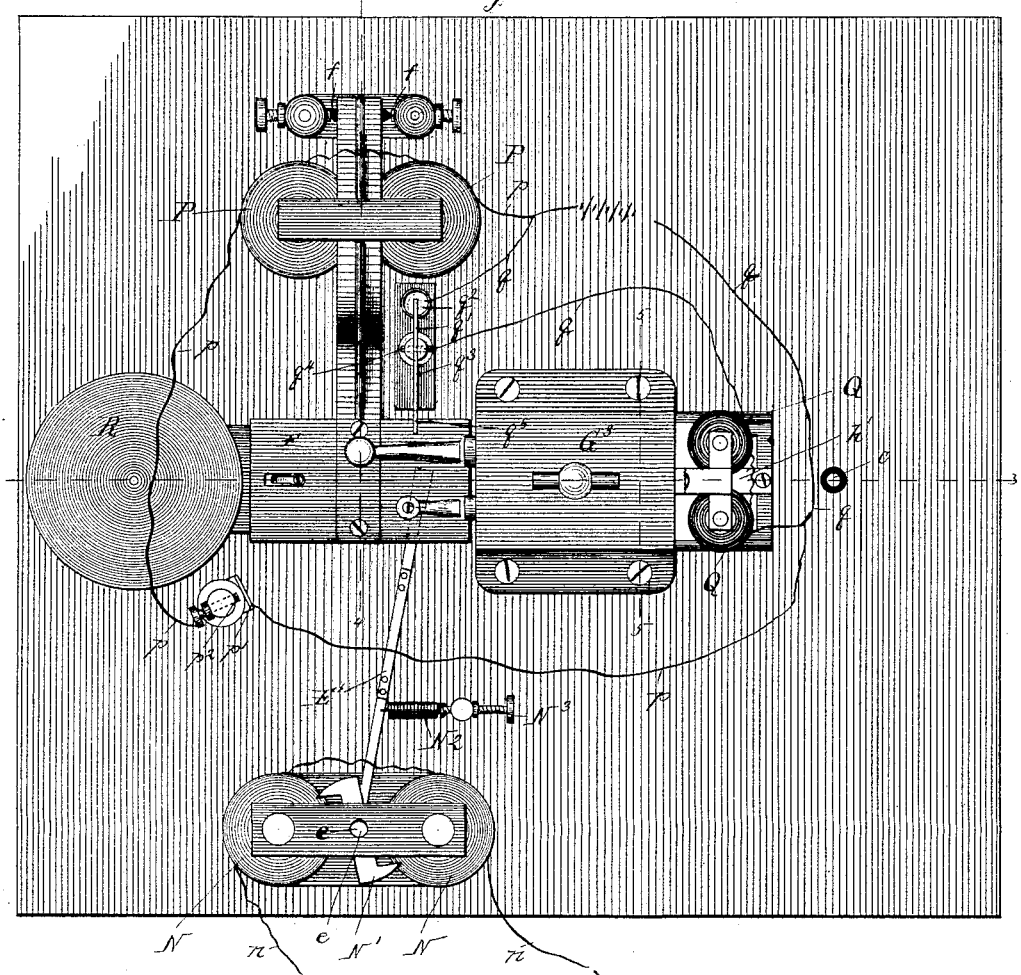
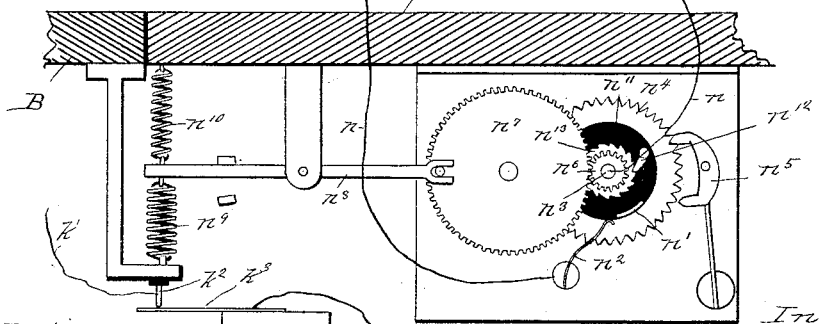
Witnesses:
Lew. C. Curtis.
H. W. Munday.
Inventor.
Edward H. Amet.
By Munday, Evarts & Adcock
his Attorneys.

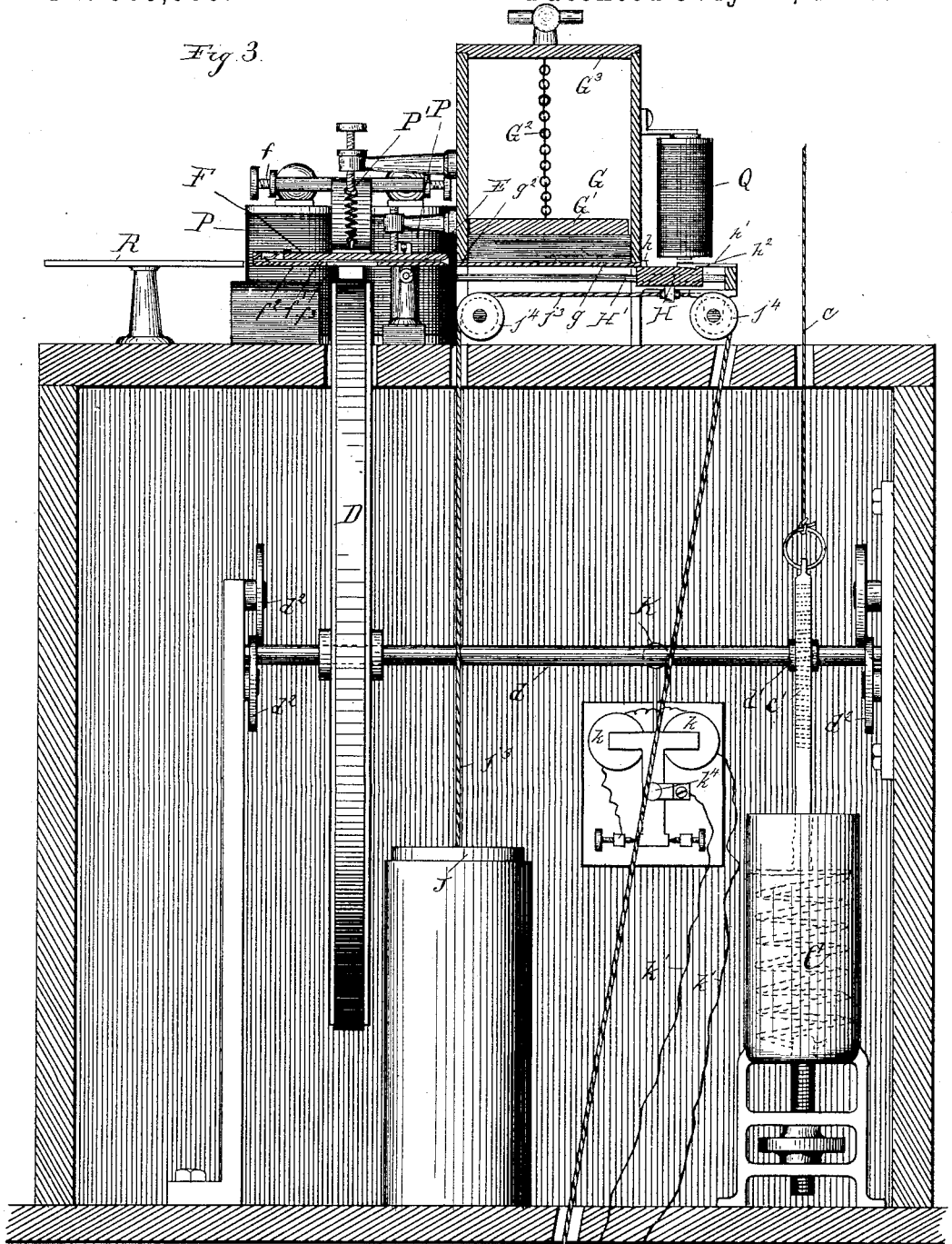

(No Model.) 5 Sheets—Sheet 4.
E. H. AMET.
AUTOMATIC WEIGHING AND RECORDING APPARATUS.
No. 385,900. Patented July 10, 1888.
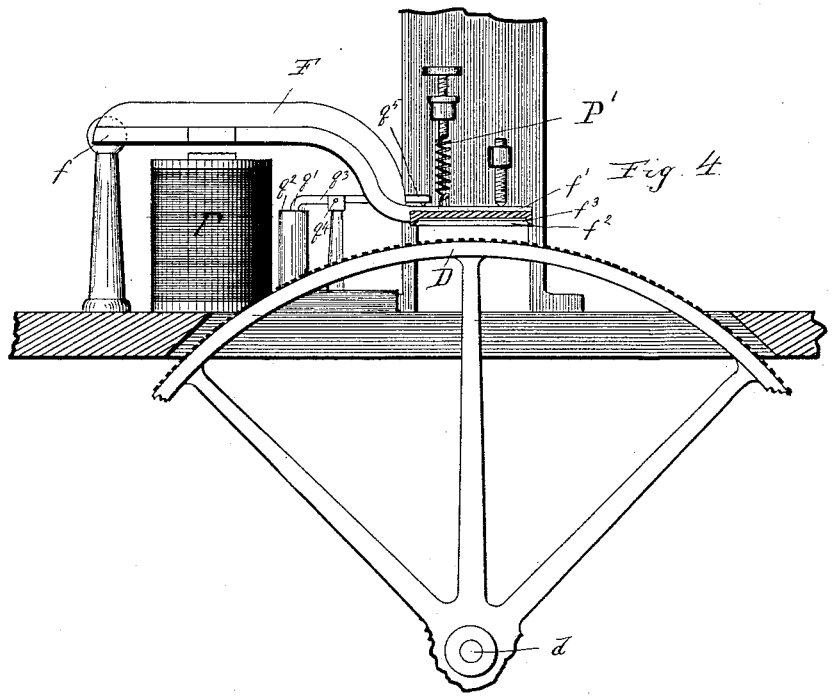
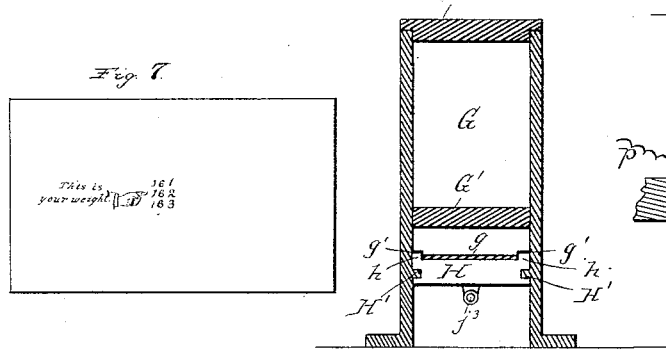
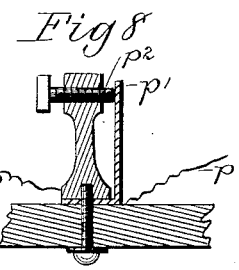
Witnesses:
Lew E. Curtis
H. W. Munday
Inventor:
Edward H. Amet.
By Munday, Evarts & Adcock
his Attorneys:

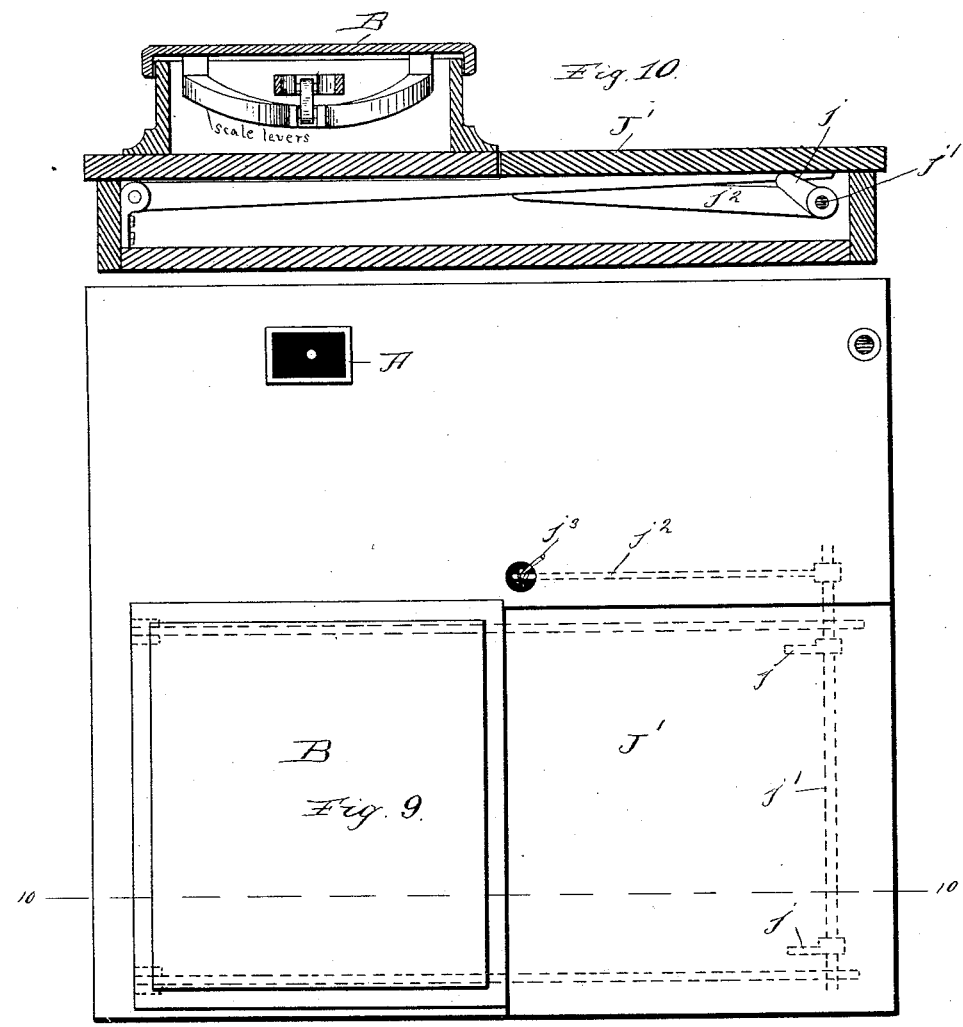

UNITED STATES PATENT OFFICE.

EDWARD H. AMET, OF CHICAGO, ILLINOIS, ASSIGNOR TO HERBERT A. STREETER, OF SAME PLACE.

AUTOMATIC WEIGHING AND RECORDING APPARATUS.

SPECIFICATION forming part of Letters Patent No. 385,900, dated July 10, 1888.

Application filed October 12, 1887. Serial No. 252,155. (No model.)

*To all whom it may concern:*

Be it known that I, EDWARD H. AMET, a citizen of the United States, residing in Chicago, in the county of Cook and State of Illinois, have invented a new and useful Improvement in Automatic Weighing and Recording Apparatus, of which the following is a specification.

My invention relates to automatic scales.

The object of my present invention is to provide a scale apparatus which will operate automatically to weigh persons as they step upon the platform of the scale and to print or record the weight of each upon a card which is automatically fed to the machine and delivered therefrom, so that each person weighed may have or take the card with his weight printed thereon. The cards may contain other printed matter—as, for example, business advertisements of the firm or person owning or renting the scale. The scale thus becomes not only a convenience to the public, but a good and continuous means of advertisement.

My invention consists, in connection with a scale having a variable counterpoise beam or lever, a printing-wheel operated by the movement of the variable counterpoise-beam, and an impression lever or block, of a card receptacle and a device for automatically feeding the cards one by one from said receptacle between the printing-wheel and impression-block.

It further consists, in connection with such elements or devices, in an impression lever or block provided with a slot, groove, or receptacle to receive the card as it is fed forward from the card-holder, so that the impression-block itself will hold and guide the card while it is being forced against the type on the printing-wheel.

It further consists, in connection with the same, in a scale-platform provided with a movable step or treadle connected with the card-feed slide and with a weight for operating said slide, so that the person stepping on the platform to be weighed will thus retract the card-feed slide and raise the weight by which the card-feed slide is moved forward.

It further consists in a card-feed slide provided with a catch-lever or pawl to hold it in its retracted position until said catch-lever is released by the person being weighed. This latter is done or preferably done by providing the scale-platform with a contact-piece, which closes an electric circuit when the scale-platform is depressed by the weight of the person standing on the platform.

It further consists in the novel devices and novel combinations of devices herein shown and described, and more particularly pointed out in the claims.

In the accompanying drawings, which form a part of this specification, and in which similar letters of reference indicate like parts, Figure 1 is a side elevation, partly in section, of a device embodying my invention. Fig. 2 is a partial plan view looking down from line 2 2 of Fig. 1. Fig. 3 is a vertical section on line 3 3 of Fig. 2. Fig. 4 is a vertical section on line 4 4 of Fig. 2. Fig. 5 is a vertical section on line 5 5 of Fig. 2. Fig. 6 is a vertical section on line 6 6 of Fig. 1, and Fig. 7 is a view showing a card with a weight as printed thereon by the machine. Fig. 8 is a detail view of the contacts for closing the circuit which operates the impression-block. Fig. 9 is a detail plan view of the movable platform or step in front of the scale-platform by which, either directly or indirectly, the printing or recording mechanism of the scale is operated or a weight raised for operating it by the weight of the person to be raised preliminary to his stepping onto the scale-platform. Fig. 10 is a vertical section through the scale-platform and movable step or platform in front thereof.

In said drawings, A represents the frame of the scale; B, its platform; C, its variable counterpoise; $b$, one of the levers or beams connecting the platform with the variable counterpoise, and $c$ a link connecting the end of the lever $b$ with the counterpoise C, or with the rack $c'$, secured thereto; D, the printing-wheel; $d$, its shaft, and $d'$ the gear thereon meshing with the rack $c'$, so that the motion of the variable counterpoise-lever $b$ will be communicated to the type-wheel D. All these parts may be of any ordinary or well-known construction.

As shown in the drawings, the variable counterpoise C consists of a spring. Other variable counterpoises may, however, be used—as, for example, a weight submerged or partially submerged in a liquid.

E is an inking roller or pad mounted on the end of the lever E', which vibrates horizontally and transversely across the periphery of the type-wheel D, having a vertical shaft or pivot, $e$, to which it is rigidly secured.

F is the impression block or lever, pivoted at $f$ to the frame of the machine. It is furnished with a receptacle, $f'$, for the card to be printed. This receptacle may consist of a horizontal slot or groove cut in the impression-block, but is preferably made by securing a separate plate, $f^2$, on the under face of the impression-block, the plate being furnished with shoulders at its side edges, so as to leave a space between it and the impression-block equal to the thickness of a single card. A slot or opening, $f^3$, in the central portion of the plate $f^2$ permits the type on the printing-wheel to come in contact with the card in the impression-block. This opening should be wide enough in the direction of the periphery of the printing-wheel to permit three consecutive numbers or marks on the printing-wheel to be printed upon the card, as indicated in Fig. 7. The purpose of this is to indicate fractions of a pound by the position of the numbers in respect to the pointer or arrow printed upon the card at the middle thereof. The pointer or arrow may be previously printed upon the card, or it may be printed thereon by a fixed type secured to the frame of the machine at one side of the type-wheel and on a level with the type on the periphery of the wheel.

G is the card-holder, consisting, preferably, of a box or receptacle having a weighted follower, G', connected by a flexible chain or cord, $G^2$, with the removable cover $G^3$. The bottom $g$ of the card-holder is furnished with one, two, or more longitudinal slots, $g'$, through which the lugs $h$ on the card-feed slide H project, so as to push or feed the bottom card out through the slot or opening $g^2$ in the end of the box and force it into the receptacle $f'$ in the impression block or lever. The slide H reciprocates in suitable guides, H', secured to the frame of the machine just under the card-holder G. The feed-lugs $h$ on the feed-slide are made just long enough to project the thickness of one card above the bottom of the card-box G, and the feed-opening $g^2$ is just large or wide enough to permit a single card to pass out at a time.

The reciprocating feed-slide H is moved forward by a weight, J, and retracted by a movable step or foot-lever, J', arranged in front of the scale-platform B, and which is connected with the feed-slide through the bent lever $j$, pivoted at $j'$ to the frame, the long arm $j^2$ of which is connected to the slide by the cord $j^3$, which passes over the pulleys $j^4$ $j^4$ and connects with the weight J, so that the same movement will raise the weight into position. The step J vibrates up and down, being depressed by the weight of the person stepping thereon and relieved when the person steps off of the same. When the card-feed slide is thus retracted and its operating-weight raised, it is held in this retracted position by a pawl or catch-lever, $h'$, which engages a suitable notch or projection, $h^2$, on the slide H. The pawl $h'$ is preferably made in the form of a flat spring. However, a separate spring may be used, if preferred, to hold it normally in position to engage the slide H or the projection or notch thereon.

The shaft $d$ of the printing-wheel D is journaled on comparatively large anti-friction wheels or rollers $d^2$; but to cause the mechanism to weigh quickly with certainty and accuracy to the fraction of a pound I combine with the scale, its movable counterpoise, printing-wheel, and shaft a light vibrating hammer, K, which gently and continuouly taps the shaft $d$ of the printing-wheel at a point slightly above its center line or axis, by which means any frictional sticking of the parts will be obviated and the type-wheel prevented from coming to rest at any other point than the true balance for the person or weight being weighed on the scale-platform. This shaft tapper or hammer K is vibrated or preferably vibrated by an electro-magnet, $k$, included in a normally-open circuit, $k'$, which is closed by a contact-piece, $k^2$, secured to the movable platform B of the scale, that makes connection with the contact $k^3$ when there is a person or weight on the scale-platform. The armature of the magnet is secured to the pivoted hammer K, and the same is constructed and operates like the ordinary electric bells to make and break the circuit at each stroke by the rebound of the hammer when it strikes the shaft, the circuit being broken by the vibrating hammer or armature at the contact-point $k^4$. The battery is represented at $k^5$. By this means the moment a person steps on the scale-platform the hammer K will begin to operate or tap the shaft $d$, and so continue until the person is weighed and steps off the scale-platform.

The inking-lever E' is operated or may be preferably operated by an electro-magnet, N, the armature N' of which is secured rigidly to the shaft or pivot $e$ of the lever E'. A spring, $N^2$, furnished with an adjusting-screw, $N^3$, serves to retract the inking-lever. The magnet N is included in a normally-open circuit, $n$, which is closed by a movable contact-piece, $n'$, which is connected with and operated by the scale-platform B making connection with the fixed spring-contact $n^2$. The circuit $n$ is not closed at once by the movement of the platform B, in order to give time for the printing-wheel to reach a true balance and come to rest before the inking-lever and impression-lever are operated. This result is effected by mounting the contact $n'$ on the shaft $n^3$ of an escapement-wheel, $n^4$, the motion of which is regulated by an escapement, $n^5$. Motion is communicated from the scale-platform B to the shaft $n^3$ through a pinion, $n^6$, meshing with a gear, $n^7$, which is oscillated by a lever, $n^8$, connected to the scale platform by a spring, $n^9$. A spring, $n^{10}$, connected at one end to frame A, returns the lever to place. The contact $n'$ is secured in a hard-rubber or insulating disk or wheel, $n^{11}$, journaled on the shaft $n^3$ and connected rigidly with the escapement-wheel $n^4$. A pawl, $n^{12}$, pivoted on said disk $n^{11}$, engages a ratchet, $n^{13}$, secured to the shaft $n^3$, so that the rotation of the shaft by the lever $n^8$ will also rotate the contact-carrying disk and the escapement-wheel. The escapement-wheel causes the contact-wheel $n^{11}$ to move slowly, and may be so timed as to close the circuit any desired or suitable length of time after the person steps upon the platform B and necessary to allow the printing-wheel to reach the true balance and come to rest. The spring or yielding connection $n^9$ between the lever $n^8$ and the scale-platform permits the platform to descend to the full limit of its motion without straining the slow-moving lever $n^8$.

The impression-lever F is operated or is preferably operated by an electro-magnet, P, included in a normally-open circuit, $p$, which is closed after the inking-lever is operated to ink the type by said lever impinging or pressing against the movable or spring contact $p'$, which makes connection with the contact $p^2$. (See Figs. 2 and 8.) A spring, P', retracts the impression lever and holds it in such position ready to receive a card from the card-holder.

The spring-pawl $h'$ is operated to release the card-feed slide, by an electro-magnet, Q, included in a normally-open circuit, $q$, which is closed by the movable contact $q'$ making connection with the fixed contact $q^2$. The contact $q^2$ is preferably a mercury contact, and the contact $q'$ is secured to a lever, $q^3$, pivoted at $q^4$ to the frame, the long arm $q^5$ of which lever projects over the impression block or lever F, so that the return movement of the impression block or lever will operate said contact-lever $q^3$. The spring P' retracts the impression block or lever F by a quick movement, and thus by a blow causes the lever $q^3$ to vibrate and dip its lighter contact end into the mercury contact $q^2$. Almost as soon as the circuit is thus closed the long and heavier end of the lever $q^3$ descends, and thus opens the circuit. This circuit need be closed but an instant in order to operate the pawl $h'$ and release the card-feed slide.

In operation, a card being already in place in the card receptacle of the impression-block, the person to be weighed, by stepping upon the movable step J', retracts the card-feed slide into position, where it is held by the spring-pawl until the person is weighed and his weight printed upon the card in the impression-block. By stepping upon the scale-platform the shaft-tapper circuit $k'$ is closed, and the tapper thus set in operation while the printing-wheel is reaching the true balance and coming to rest. By the time the printing-wheel D comes to rest the slow-moving escapement governed platform-operated contact $n'$ will close the inking-lever circuit $n$, and thus operate the same and ink the proper type on the wheel D. After the inking is done, the inking-lever will move the contact $p'$ and close the impression lever circuit $p$, and thus cause the impression-block F with the card therein to strike against the type on the printing-wheel and print the weight upon the card. The return movement of the printing-lever F closes the circuit $q$ and releases the card-feed slide from its holding-pawl $h'$, thus feeding another card from the card-holder into the impression-block F, and thereby pushing the printed card out and delivering it upon the delivery-table R.

It will be observed that the motive power for operating the impression lever and inker is the electro-magnets, while the card-feed slide is operated by the weight J and step J'. I prefer to operate the inking and impression levers by electro magnets; but they may be operated by other means, and the card-feed slide may also, if desired, be operated by a magnet. It should also be observed that instead of operating the circuit-closing contact from the scale-platform, keys or push-buttons may be furnished for operating these contacts by hand, if desired. That shown in the drawings, however, is the most perfected and improved form of my invention and that which I prefer to employ in practicing the same.

I claim—

1. The combination, with a scale having a variable counterpoise and a printing-wheel connected with and operated by one of the beams or levers of the scale, of a card-holder adjacent to said printing-wheel and card-feed slide for feeding the cards one by one from said card-holder to said printing-wheel, substantially as specified.

2. The combination, in a weighing and recording scale, of its variable counterpoise, a printing-wheel and impression-block, with a card-holder adjacent to said printing-wheel, and a card-feed slide for feeding the cards one by one from said card-holder to and between said printing-wheel and impression-block, substantially as specified.

3. The combination, in a weighing and recording scale, of its variable counterpoise, printing-wheel, and inker, with an impression-block having a receptacle to receive and hold a single card, a card-holder, and a card-feed slide for delivering the cards one by one from said card-holder into the impression-block, substantially as specified.

4. The combination, in a weighing and recording scale, of its platform, variable counterpoise, type-wheel, and impression-block, with a card-holder, a card-feed slide, and a movable step in front of the scale-platform for operating or retracting said card-feed slide, substantially as specified.

5. The combination, in a weighing and recording scale, of its platform, variable counterpoise, type-wheel, and impression-block, with a card-holder, a card-feed slide, and a movable step in front of the scale-platform for operating or retracting said card-feed slide, a weight, and a cord and pulleys, substantially as specified.

6. The combination of a recording and weighing scale with card-holder G, having slotted bottom $g$ and opening $g^2$, card-feed slide H, having upwardly-projecting feed-lugs $h$, weight J, movable step J', and a cord and pulleys connecting said weight and movable step, substantially as specified.

7. The combination of a recording and weighing scale with card-holder G, having slotted bottom $g$ and opening $g^2$, card-feed slide H, having upwardly-projecting feed-lugs $h$, weight J, movable step J', bent lever $j$, cord $j^3$, and pulleys $j^4$, substantially as specified.

8. The combination of a recording and weighing scale with card-holder G, having slotted bottom $g$ and opening $g^2$, card-feed slide H, having upwardly-projecting feed-lugs $h$, weight J, movable step J', bent lever $j$, cord $j^3$, pulleys $j^4$, catch-lever $h'$, and catch projection $h^2$ on said slide H, substantially as specified.

9. The combination of a recording and weighing scale with card-holder G, having slotted bottom $g$ and opening $g^2$, card-feed slide H, having upwardly-projecting feed-lugs $h$, weight J, movable step J', bent lever $j$, cord $j^3$, pulleys $j^4$, catch-lever $h'$, catch projection $h^2$ on said slide H, and an electro-magnet for closing said catch-lever $h'$, substantially as specified.

10. The combination, with a scale platform, levers, and counterpoise, of a movable type or printing device connected with and operated by one of the scale-levers, an impression-block, a card-holder adjacent to said impression-block, and a device for feeding the cards one by one into position for printing between said movable type or printing device and said impression-block, substantially as specified.

11. The combination, with a recording and weighing scale having a variable counterpoise and printing-wheel, of a vibrating hammer to tap the shaft of the printing-wheel and prevent sticking, substantially as specified.

12. The combination, with a recording and weighing scale having a variable counterpoise and printing-wheel, of a vibrating hammer to tap the shaft of the printing-wheel and prevent sticking, and an electro-magnet for operating said hammer, substantially as specified.

13. The combination, with a recording and weighing scale having a variable counterpoise and a printing-wheel, of a vibrating hammer to tap the shaft of the printing-wheel and prevent sticking, and an electro-magnet for operating said hammer, said electro-magnet being included in a normally open circuit having a movable contact-piece connected with and operated by the platform of the scale, substantially as specified.

14. The combination, with a recording and weighing scale, its variable counterpoise, a printing-wheel, an inker, and an impression block or lever, of a card-holder, a card-feed slide, a weight and step-lever for operating said feed-slide, a catch-lever for holding said feed-slide retracted, an electro-magnet, N, for operating the inker, an electro-magnet, P, for operating the printing-lever, and an electro-magnet, Q, for operating said catch-lever, substantially as specified.

15. The combination, with a recording and weighing scale, its variable counterpoise, a printing-wheel, an inker, and an impression block or lever, of a card-holder, a card-feed slide, a weight and step-lever for operating said feed-slide, a catch-lever for holding said feed-slide retracted, an electro-magnet, N, for operating the inker, an electro-magnet, P, for operating the printing-lever, and an electro-magnet, Q, for operating said catch-lever, a printing-wheel-shaft tapper, K, and an electro-magnet for operating the same, substantially as specified.

16. The combination, with a recording and weighing scale, its variable counterpoise, a printing-wheel, an inker, and an impression block or lever, of a card-holder, a card-feed slide, a weight and step-lever for operating said feed-slide, a catch-lever for holding said feed-slide retracted, an electro-magnet, N, for operating the inker, an electro-magnet, P, for operating the printing-lever, and an electro-magnet, Q, for operating said catch lever, said electro-magnet N being included in a normally-open circuit having a movable contact connected with and operated by the scale-platform, substantially as specified.

17. The combination, in a recording and weighing scale, of its movable platform, with an electric circuit having an operating magnet included therein, a fixed contact and movable contact connected with and operated by said platform for closing said circuit, a device for retarding the motion of said movable contact, and mechanism provided with a spring or yielding connection for communicating motion from said movable platform to said movable contact, substantially as specified.

18. The combination, in a weighing and recording scale, of the scale-platform and printing mechanism, with a movable step or platform in front of the scale-platform for operating the printing mechanism of the scale by the weight of the person stepping onto the scale platform to be weighed, substantially as specified.

19. The combination of scale-platform B, variable counterpoise C, printing-wheel D, inker E, printing-lever F, with an operating-magnet, N, its circuit $n$, contact $n^2$, movable contact $n'$, shaft $n^3$, escapement-wheel $n^4$, escapement $n^5$, pinion $n^6$, gear $n^7$, lever $n^8$, and spring $n^9$, substantially as specified.

20. The combination of scale-platform B, variable counterpoise C, printing-wheel D, inker E, printing-lever F, with an operating-magnet, N, its circuit $n$, contact $n^2$, movable contact $n'$, shaft $n^3$, escapement-wheel $n^4$, escapement $n^5$, pinion $n^6$, gear $n^7$, lever $n^8$, spring $n^9$, insulating-disk $n^{11}$, pawl $n^{12}$, and ratchet $n^{13}$, substantially as specified.

21. The combination, in a printing and recording scale, of the scale-levers, a variable counterpoise, a type-wheel connected with and operated by one of the scale-levers, an inking-roller, and a vibratory arm or lever swinging transversely across the periphery of said type-wheel, upon which said inking-roller is mounted, substantially as specified.

EDWARD H. AMET.

Witnesses:
H. M. MUNDAY,
LEW. E. CURTIS.